(No Model.)  2 Sheets—Sheet 1.
C. IRISH.
POTATO PLANTER.
No. 500,133.  Patented June 27, 1893.
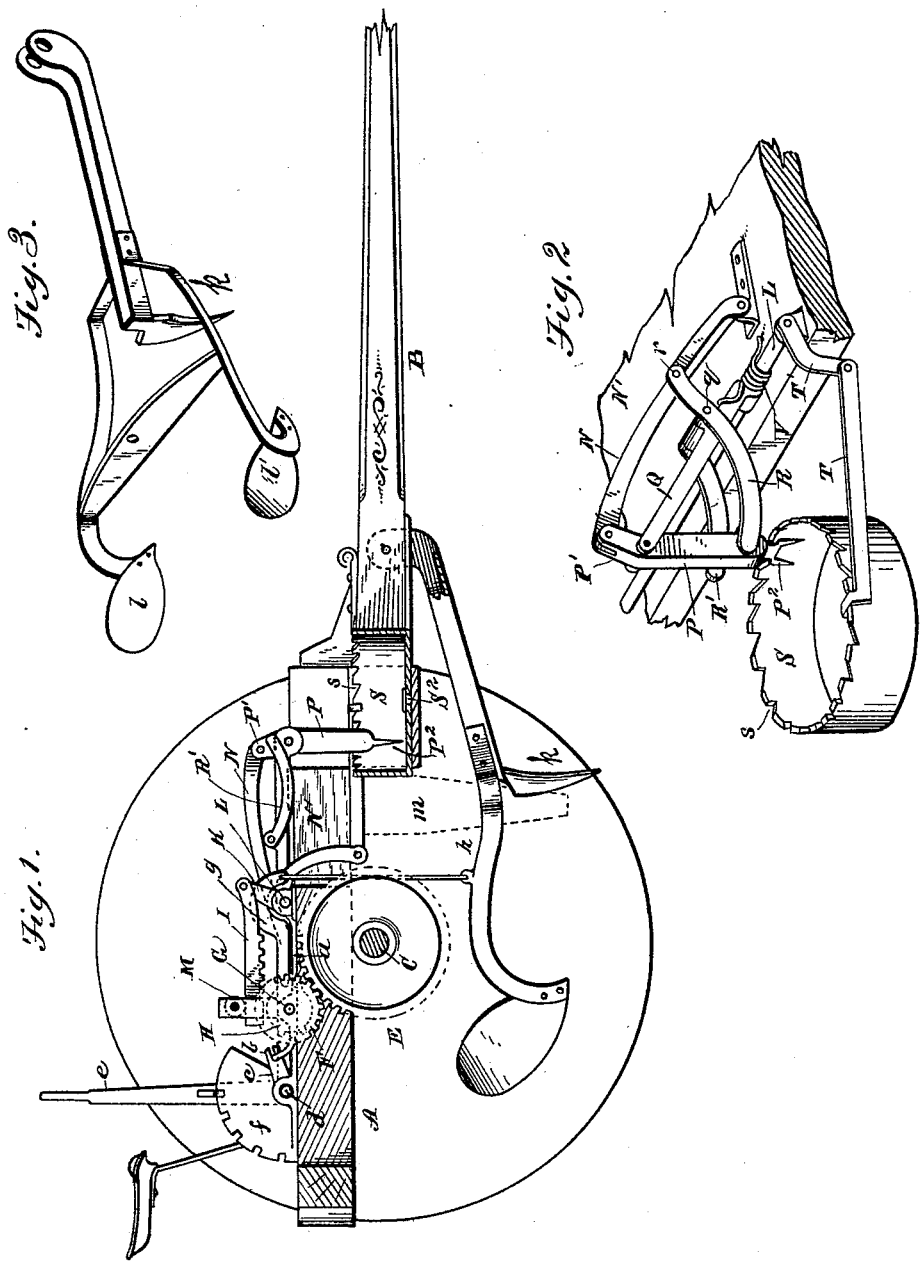
WITNESSES
H. W. Bradford
Effie I. Croft
INVENTOR
Charles Irish
by Parker & Burton
Attorneys.

(No Model.) 2 Sheets—Sheet 2.
C. IRISH.
POTATO PLANTER.
No. 500,133. Patented June 27, 1893.
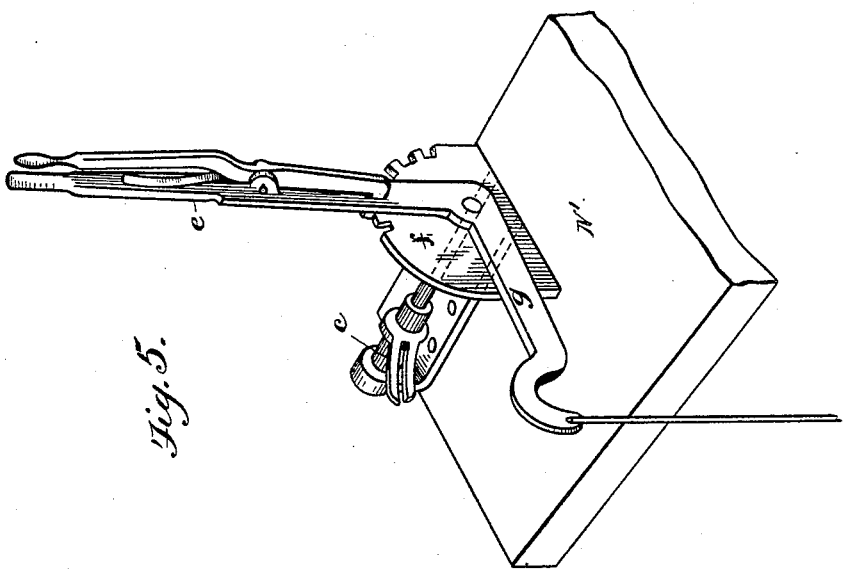
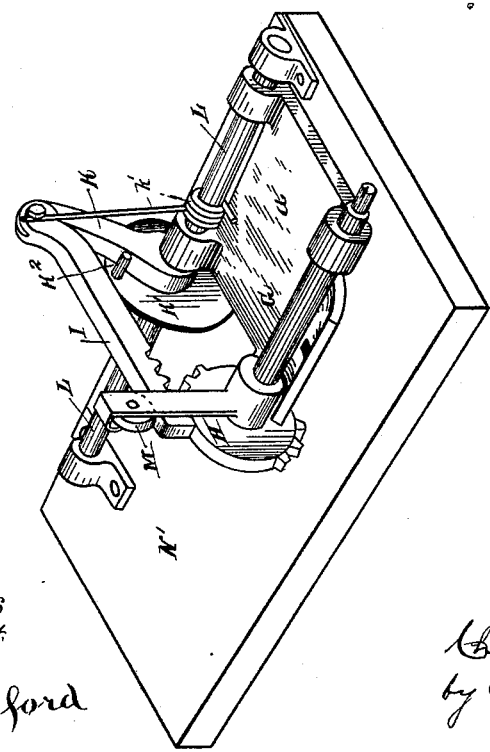
WITNESSES
Effie I. Croft.
T. W. Bradford.
INVENTOR
Charles Irish
by Parker W Burton
Attorneys.

UNITED STATES PATENT OFFICE.

CHARLES IRISH, OF NORRISVILLE, MICHIGAN.

POTATO-PLANTER.

SPECIFICATION forming part of Letters Patent No. 500,133, dated June 27, 1893.

Application filed March 21, 1893. Serial No. 467,052. (No model.)

*To all whom it may concern:*

Be it known that I, CHARLES IRISH, a citizen of the United States, residing at Norrisville, county of Leelanaw, State of Michigan, have invented a certain new and useful Improvement in Potato-Planters; and I declare the following to be a full, clear, and exact description of the invention, such as will enable others skilled in the art to which it pertains to make and use the same, reference being had to the accompanying drawings, which form a part of this specification.

This invention relates to potato planters, and has for its object improvements in that class of planters, in which the potatoes to be used for planting are carried in a hopper that is mounted on wheels, and are taken from the hopper, one or two at a time at proper intervals and deposited in a furrow between the wheels of the cart, and are then covered by a suitably arranged plow.

The invention is shown in the accompanying drawings in which—

Figure 1, is a side elevation. Fig. 2, is a perspective view of the hopper and fork by which the separate pieces of potato are lifted out of the hopper. Fig. 3, is a perspective of the central plow and the following wing coverers. Fig. 4 is an enlarged detail of the shafts, mutilated wheel and the parts operated thereby. Fig. 5, is an enlarged detail of the lever by means of which the planter is thrown in and out of gear and the plow is lifted out of or adjusted in the ground.

A, indicates the frame to which a tongue B, is secured and also an axle C; the axle C, turns in boxes properly secured to the frame A, and the main driving wheels upon which the cart is carried are secured to and turn with the axle. There is also secured to the axle a master wheel E, which meshes with a pinion F, on a shaft G. On the same shaft G, is a mutilated pinion H, which engages with a rack bar I.

The rack bar I, is pivoted at one end to an arm K, turning on the rock shaft L, and its other or free end is held in mesh or engagement with the pinion by a pressure and friction roller M.

N', indicates a sill of the main framework to which is pivoted a link N, and the link N, has pivoted to its upper or free end the upper end P', of the fork or picker P. The lower end of the fork or picker P is provided with two or more pointed tines $P^2$. Near the upper end P', of the fork P, is pivoted an arm Q, that is rigidly connected to and extends from a rock shaft L. To the link N, is pivoted one end of the wiper R, and the wiper R, extends forward from its pivot r, so far that its front end is in position to wipe the prongs $P^2$, of the fork, it passes or crosses the arm Q, and at the intersection q, is pivoted to the arm Q.

R', indicates a parallel wiper arm arranged to wipe the opposite tine $P^2$; the wiper arms R, R', are united by the pin by which they are pinned to the arm Q, and while both turn with this pin in the bearing through the arm Q, they remain rigid with respect to each other.

At the front of the frame A, is a hopper S, centrally supported on a vertical shaft $S^2$, and free to revolve horizontally. The hopper is cylindrical, and has its upper edge provided with ratchet teeth s; with these ratchet teeth s, engages a pawl T, and the pawl T, is actuated by a crank T', secured to rock shaft L.

V, indicates a coiled spring wound around the rock shaft L, engaging with the arm Q, and actuating that arm in a direction to pull the fork R, downward, and at the same time to pull the wrist pin of the crank T', backward and to retract the pawl T.

The shaft G, upon which are mounted the pinion F, and the mutilated pinion H, is secured in boxes that are made fast to a framework a, hinged at its forward end to the shaft L. The rear end of the secondary frame a, is held in place by a hook or catch b, that engages with a forked arm c, of the hand lever shaft d.

e, indicates a hand lever arranged to turn a rock shaft d.

f, indicates a notched quadrant detent with which a spring actuated lever or pawl on the hand lever e, engages. The rock shaft d, is provided with two lifting arms c, g. Of these the lifting arm c, raises the rear end of the secondary frame a, and the lifting arm g, raises the plow beam h, with which it is connected. The plow beam h, is hinged at its forward end to the forward part of the frame or to the tongue, and the depth of cut is regulated by lifting the rear end of the plow beam by means of the hand lever e. To the plow beam is secured in front a digging shovel which prepares a trench in which to deposit the potatoes and behind the digging shovel on either side is a covering shovel or wing l, l'.

m, indicates a guide or chute secured to the frame and presenting its upper opening at the rear of the hopper S, in position proper to receive the potatoes that have been picked up by the fork R², and pushed off from the forks by the wipers R, R'.

To the rock shaft L, adjacent to the arm K, is attached a crank or rock arm K', the wrist pin of which K², lies behind the loose arm K, but engages with the loose arm K, when the rack arm I, is drawn backward by the actuating movement of the mutilated wheel H.

k', indicates a spring arranged to throw the rack arm I, and the upper end of the loose arm K, forward.

The combination of parts just described enables the fork to work at different depths in the hopper, as the forward and downward motion of the fork is limited or may be limited by the material in the hopper, while the forward and backward motion of the rack arm must be uniform.

The operation of the device is as follows: When it is desired to travel without planting, the upper end of the hand lever e, is thrown backward, and this rocks the arm c, upward and raises the frame a, throwing the pinion G, out of mesh with the master wheel E; it also lifts the forward end of the arm g, and lifts the plow points out of the ground; the main wheels will now turn without operating any of the machinery. To operate the machinery, the upper end of the hand lever e, is thrown forward dropping the plow points, and dropping the rear end of the frame a, until the pinion G, meshes with the master wheel E. The wheel and pinion will be held in mesh by the overhanging lip of the rock arm c. The mutilated wheel H, has two parts toothed and two parts plain and with each revolution of the pinion G, the rack arm I, will be drawn twice backward, and will twice slip forward under the actuating force of the spring k'. With each backward motion of the rack arm I, the rock shaft L, will have turned to lift the fork R², and the system of links by which the fork R², is connected to the rock shaft, and to the sills of the frame, causes the rock shaft first to lift nearly straight upward until the tines of the fork are above the edge of the hopper. It then draws backward, still rising until it passes between the wiper arms R, R'. By the same motion the wiper arms are drawn slightly backward but are thrown downward at their forward ends and push off from the tines of the fork any potato or piece of potato that may have been impaled on the tines. When the rack arm I, passes out of engagement with the toothed portion of the mutilated wheel and slips forward, the rock shaft L, is free to turn, and under the actuating force of the spring V, the arm Q, is pushed quickly downward, pushing the forks forcibly downward until they are stopped by the potatoes in the hopper or by the bottom of the hopper, and by this motion, the tines of the fork will impale one or two pieces of potato which will be lifted up out of the hopper pushed off of the forks by the wiper arms, dropped into the chute m, conveyed into the furrow behind the front plow k, in position to be covered by the covering wings l. Z'. As the fork rises, the pawl T, pushes the edge of the hopper S, giving it a rotary motion and bringing a fresh supply of tubers to the tines of the fork.

What I claim is—

1. In a potato planter, the combination with a frame, axle and driving wheels, of the gear wheels, actuating rack, rock shaft, and hinges, actuating a fork and a revolving hopper, substantially as described.

2. In a potato planter, the frame and driving wheels a master wheel, a hinged frame carrying gear wheels adapted to swing in and out of connection, actuating master wheel, a rack bar, linked to a sleeve on a rock shaft, a fork and wiper bars actuated by said rock shaft, means for causing the rack arm to engage with and actuate the rock shaft, substantially as described.

3. In a potato planter, in combination with the main frame work, a hopper and means for rotating the same on its vertical axis, a tined fork, and means for giving said fork vertical motion, a guiding chute, and furrowing plow and covering plows, substantially as and for the purpose specified.

4. In a potato planter, the combination of the main frame wheels and axle, the plow beam, furrowing plow and covering plows, a rotating hopper, a fork and rock shaft, means for giving to the rock shaft an intermitting motion and mechanism intermediate the rock shaft and the fork whereby the fork is lifted vertically out of said hopper and carried over a chute, substantially as and for the purpose described.

In testimony whereof I sign this specification in the presence of two witnesses.

CHARLES IRISH.

Witnesses:
F. X. SHOBER,
L. SOULE.